W. H. STOBIE.
APPARATUS FOR DISINTEGRATING FIBROUS MATERIAL USED IN THE MANUFACTURE OF PAPER PULP.
APPLICATION FILED JULY 13, 1914.
Reissued May 18, 1915. 13,919.
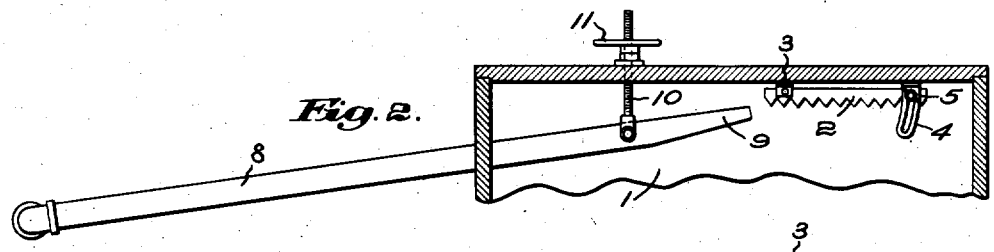
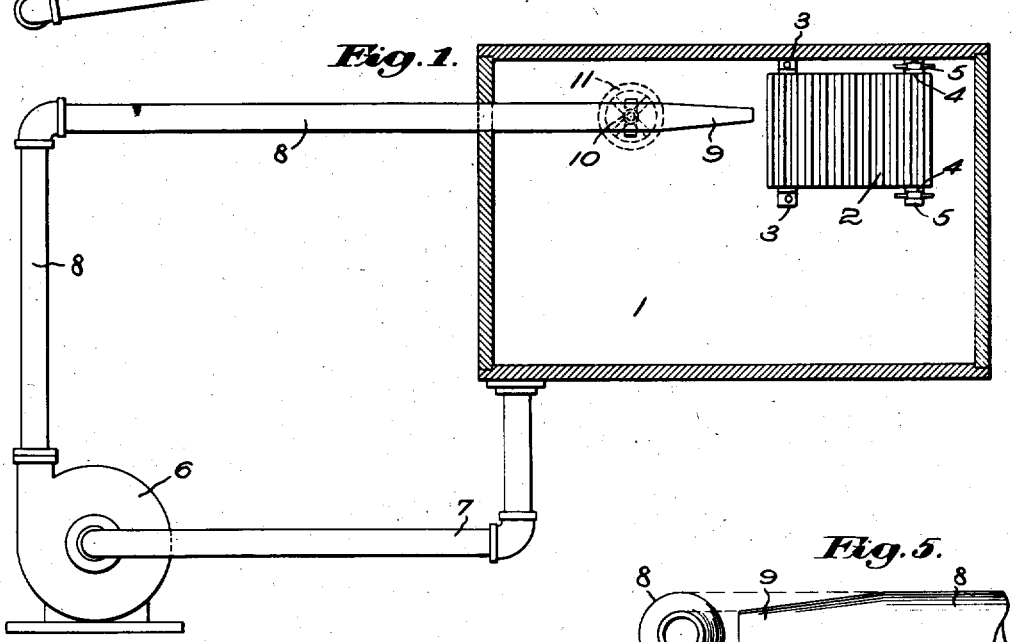
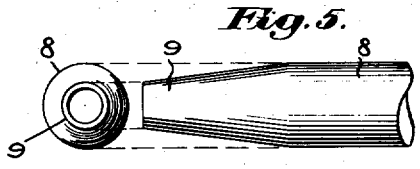
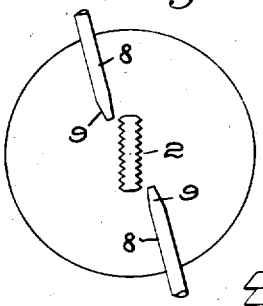
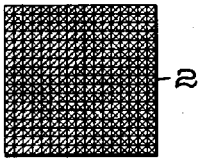
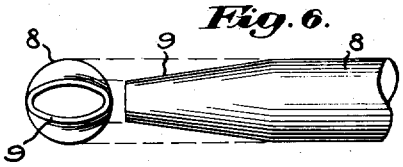
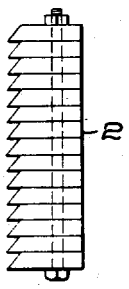
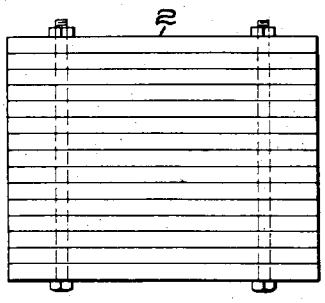
Witnesses:
Horace A. Grossman
Carl L. Choate.
Inventor:
William H. Stobie.
by Kenny, Berth, Jennings & Kenny
Attys

UNITED STATES PATENT OFFICE.

WILLIAM H. STOBIE, OF WATERVILLE, MAINE, ASSIGNOR TO HOLLINGSWORTH & WHITNEY COMPANY, OF BOSTON, MASSACHUSETTS.

APPARATUS FOR DISINTEGRATING FIBROUS MATERIAL USED IN THE MANUFACTURE OF PAPER-PULP.

13,919. Specification of Reissued Letters Patent. Reissued May 18, 1915.

Original No. 1,062,306, dated May 20, 1913, Serial No. 693,477. Application for reissue filed July 13, 1914. Serial No. 850,814.

*To all whom it may concern:*

Be it known that I, WILLIAM H. STOBIE, a citizen of the United States, residing at Waterville, in the county of Kennebec and State of Maine, have invented certain new and useful Improvements in Apparatus for Disintegrating Fibrous Material Used in the Manufacture of Paper-Pulp; and I do hereby declare the following to be a full, clear, and exact description of the invention, such as will enable others skilled in the art to which it appertains to make and use the same.

My invention relates to an improvement in apparatus for disintegrating fibrous material used in the manufacture of paper pulp, the object being to divide or separate the fibers without breaking or cutting them sufficiently to sever them, thereby producing a stock that will felt better than the stock produced in an ordinary beating engine, and my invention consists in the parts and combination of parts as will be hereinafter more fully described and pointed out in the claims.

In the accompanying drawings, Figure 1 is a diagrammatic representation of an apparatus embodying my invention. Fig. 2 is a view in plan of same, and Figs. 3, 4, 5, 6, 7 and 8 are views of further or modified forms.

1 represents a vat or tank, to contain the paper stock which has been previously mixed with the proper proportion of water to reduce it to a consistency where it can be readily pumped and conveyed through pipes, and 2 is a plate or target mounted within the tank and provided with a serrated surface. This plate is preferably made of metal, but it may be made of sand stone or other material, and while I prefer to make it in the form of an integral plate with a serrated face, as shown in Figs. 1, 2 and 4 and particularly the latter, it may be made up of a series of blades placed face to face with their edges beveled, so that when assembled and secured by bolts or other fastening devices, as shown in Figs. 7 and 8, it constitutes in effect, a plate having a serrated face.

The plate 2 is preferably adjustably mounted so that the angle of its serrated face with relation to the nozzle may be changed, and in the present instance I have shown it hinged to brackets 3, and mounted at its other end between slotted brackets 4, the plate being provided with set screws 5, by which it may be locked so as to withstand the impact of the jet, in any position within its range of movement.

Leading from the bottom of tank 1 to the pump 6, is a pipe 7, and leading from the pump to the tank is the discharge pipe 8, terminating within the tank in a nozzle 9, the discharge end of which is preferably made circular as shown in Fig. 5, but which may be flattened or elongated as in Fig. 6. This nozzle is herein represented as so located with relation to the serrated plate 2, that the stock will strike the serrated face at an angle as shown, which angle may be changed to make it more acute or obtuse, by adjusting the plate 2 as previously explained, or by adjusting the nozzle 9 by means of the screw 10 and nut 11.

With the arrangement as shown, the stock is kept passing in a circuit through the pump and pipes, and is forced in solid and forceful stream or jet against the serrations on plate 2, and then drops back into the tank and so on through the pipes and pump and against the serrated plate, until the stock has been reduced to the proper consistency. This contact of the stock with the serrations or teeth on the plate, reduces the material to fibrous form without impairing the strength or reducing the length of the fibers of the original pulp, and roughens the individual fibers or pieces, thereby greatly enhancing their felting qualities. Instead of serrating the plate on one direction, it may be and preferablv is serrated in planes at right or other angles, thus producing a surface of points or projections, and consequently increasing the edges or angles in a given surface of the plate, as shown in Fig. 4, that are presented to the stock in its impact against the surface and in its travel therealong from the point of impact to the margin of the plate, and also thereby increasing the resistant, fiber-retaining or tenacious quality of the surface by which the escape or falling away of the fibers or stock from the surface is delayed and the separation of the fibers from each other is further advanced owing to the impact of the ensuing portion of the stock thereagainst. Such surface is one form of roughened surface by which the separation of the stock into fibers and the roughening of the fibers to facilitate their felting is effected. Instead of employing a single nozzle, the plate may be serrated on both faces with a discharge nozzle for each, as shown in Fig. 3. Again instead of circulating or repassing the stock through the vat and pump and against the plate until it has been reduced to the desired condition, I may as a step in the process project the stock against the serrated plate and then pass it on to a reducing engine or other apparatus employed in the paper making process. The apparatus may also be used for improving the quality of certain grade of pulp before it enters the paper mill, so that a pulp mill selling pulp, and not paper, could, by the use of this apparatus improve the grade and the strength of its product.

The action of the serrated face, on the stock, is to divide or separate the fibers without breaking or cutting them and this action is augmented and hastened by roughening the surface, as by the provision of points or projections, so that a multiplicity of stock dividing or separating formations is presented to the stock in its impact against and final escape from the surface, and such escape is retarded, whereby the stock, while in contact with the surface, receives the impact of the succeeding portion of the stream of stock, and experiments have demonstrated that stock can be prepared in this apparatus, for the paper machines, without any treatment whatsoever in the old style of beaters. It will also be seen that the circulating system provides for a thorough mixing of colors that may be introduced to tint or color the pulp.

It is evident that many slight changes might be resorted to in the relative arrangement of parts shown and described without departing from the spirit and scope of my invention. Hence I would have it understood that I do not wish to confine myself to the exact construction and arrangement of parts shown and described, but Having fully described my invention, what I claim as new and desire to secure by Letters-Patent, is:—

1. In apparatus for disintegrating or dividing fibrous paper stock, the combination of a serrated surface, a pump and a nozzle connected with the pump for discharging the stock against said serrated surface, means for returning the paper stock to the pump, the said nozzle being so located with relation to the serrated surface that the stock will strike the latter a glancing blow.

2. In apparatus for disintegrating or dividing fibrous paper stock, the combination of a tank, a pump, a pipe leading from the tank to the pump, a pipe leading from the pump to the first said tank, a nozzle on said last mentioned pipe, and a serrated plate located in the path of discharge from said nozzle.

3. In apparatus for disintegrating or dividing fibrous paper stock, the combination of a serrated surface, means for adjusting same, a pump, a nozzle connected with the pump for discharging the stock against said serrated surface, and means for changing the position of the nozzle with relation to said serrated surface whereby the angle of incidence may be changed.

4. In apparatus for dividing or separating the fibers of paper stock without severing them, the combination of a surface provided with individual resistant, fiber-retaining or tenacious projections, a nozzle, a tank and a pump connected with said nozzle and tank for discharging said stock forcibly against said projections, and thereby effecting the rapid, thorough division or separation of the fibers of the stock.

5. In apparatus for dividing or separating the fibers of paper stock without severing them, the combination of a surface intersectingly serrated into a multiplicity of spaced projecting points, a nozzle, a tank and a pump connected with said nozzle and tank for discharging said stock forcibly against said projections, and thereby effecting the rapid, thorough division or separation of the fibers of the stock.

6. In apparatus for disintegrating or dividing paper stock, the combination of a member having projections to effect separation of the fibers without severing them, a nozzle relatively stationarily positioned with respect to said member, a tank and a pump connected with said nozzle and tank for forcibly discharging the pulpy stock therefrom against said member to separate said stock into its fibers and to felt the latter.

7. In apparatus for disintegrating or dividing fibrous paper stock, the combination of a member having a surface intersectingly serrated into spaced or individual projections to effect separation of the fibers without severing them, a nozzle relatively stationarily positioned with respect to said member, a tank and a pump connected with said nozzle and tank for forcibly discharging the pulpy stock therefrom against said member to separate said stock into its fibers and to felt the latter.

8. In apparatus for disintegrating or dividing fibrous paper stock, the combination of a tank, a circulation-establishing device, a pipe leading from the tank to said device, a pipe leading from the said device to the tank, a nozzle on said last mentioned pipe, and a member having a serrated surface located in the path of discharge from the nozzle, whereby the fibers of the stock are separated and roughened but maintained undivided.

9. In apparatus for disintegrating or dividing fibrous stock, the combination of a tank, means including a nozzle and a forcing device for forcibly circulating and recirculating said stock into, through and out of said tank, and a member in the path of the stock discharged from said nozzle and provided with a multiplicity of spaced projections against which the stock is adapted to be discharged and disintegrated into fibers whereby the fibers of the stock are separated and roughened but maintained undivided.

10. In apparatus for dividing or separating the fibers of paper stock without severing them, the combination of a roughened surface, a nozzle, a tank and means adapted to circulate liquid material and connected with said nozzle and tank for discharging said stock forcibly against said surface and thereby effecting the division or separation of the fibers of said stock and the roughening of said fibers and a pipe for returning said liquid material to the said circulation means.

11. In apparatus for dividing or separating the fibers of paper stock without severing them, the combination of a roughened surface, a nozzle, a tank and a pump connected with said nozzle and tank for discharging said stock forcibly against said surface, and thereby effecting the division or separation of the fibers of said stock and the roughening of said fibers.

12. In apparatus for dividing or separating the fibers of paper stock without severing them, the combination of roughened, impact-receiving means, a nozzle, a tank, means adapted to circulate liquid material and connected with said nozzle and tank for discharging said stock forcibly against said impact-receiving means, and thereby effecting the division or separation of the fibers of said stock and the roughening of said fibers, and a pipe for returning said liquid material to said circulating means.

13. In apparatus for dividing or separating the fibers of paper stock without severing them, the combination of an impact-receiver having spaced projections, a nozzle, a tank, and a pump connected with said nozzle and tank for discharging said stock forcibly against said impact-receiver, and thereby effecting the division or separation of the fibers of said stock and the roughening of said fibers.

In witness whereof, I have signed my name to this specification in the presence of two subscribing witnesses.

WILLIAM H. STOBIE.

Witnesses:
JOSEPH R. GOODWIN,
PERCY M. CRAM.